(12) United States Patent  
Ramakrishnan et al.

(10) Patent No.: US 10,013,410 B2  
(45) Date of Patent: Jul. 3, 2018

(54) METHODS AND SYSTEMS FOR MANAGING ANNOTATIONS WITHIN APPLICATIONS AND WEBSITES

(71) Applicant: Conduent Business Services, LLC, Dallas, TX (US)

(72) Inventors: Jayaprakash Ramakrishnan, Palakkad (IN); Jithu Chathukutty, Cochin (IN); Manoj Rajgarhia, Rochester, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 0 days.

(21) Appl. No.: 15/216,909

(22) Filed: Jul. 22, 2016

(65) Prior Publication Data

US 2018/0024975 A1   Jan. 25, 2018

(51) Int. Cl.
| | | |
|---|---|---|
| G06F 17/00 | (2006.01) | |
| G06F 17/24 | (2006.01) | |
| G06F 17/30 | (2006.01) | |

(52) U.S. Cl.
CPC ........ G06F 17/241 (2013.01); G06F 17/3089 (2013.01); G06F 17/30867 (2013.01)

(58) Field of Classification Search
CPC .................................................. G06F 17/241
See application file for complete search history.

(56) References Cited

U.S. PATENT DOCUMENTS

| | | | | |
|---|---|---|---|---|
| 9,286,581 | B2* | 3/2016 | Piersol | G06F 17/243 |
| 2002/0152064 | A1* | 10/2002 | Dutta | G06F 17/241 704/9 |
| 2005/0216457 | A1* | 9/2005 | Walther | G06F 17/30696 |
| 2006/0053364 | A1* | 3/2006 | Hollander | G06F 17/241 715/232 |
| 2006/0075205 | A1* | 4/2006 | Martin | G06F 17/30887 711/200 |
| 2007/0055926 | A1* | 3/2007 | Christiansen | G06F 17/241 715/210 |
| 2008/0005064 | A1* | 1/2008 | Sarukkai | G06F 17/241 |
| 2008/0147677 | A1* | 6/2008 | Nishino | G06F 17/241 |
| 2009/0044144 | A1* | 2/2009 | Morris | G06F 3/04842 715/804 |
| 2009/0217150 | A1* | 8/2009 | Lin | G06F 17/30899 715/232 |
| 2012/0030553 | A1* | 2/2012 | Delpha | G06F 17/30029 715/205 |
| 2013/0031449 | A1* | 1/2013 | Griffiths | G06F 17/2247 715/205 |
| 2014/0006921 | A1* | 1/2014 | Gopinath | G06F 17/241 715/230 |

(Continued)

*Primary Examiner* — Laurie A Ries

(74) *Attorney, Agent, or Firm* — Jones Robb, PLLC

(57) ABSTRACT

The present disclosure discloses methods and systems for managing one or more annotations for a host application through an annotation tool. The annotation tool implements a user interface for users to create, store, access, share or display one or more annotations corresponding to a page of the host application. The annotation tool also implements a back-end interface for processing the one or more annotations created by the user. The annotation tool stores the one or more annotations, associates the one or more annotations with the page of the host application, and allows further retrieval of the one or more annotations from any user device.

26 Claims, 6 Drawing Sheets

(56) References Cited

U.S. PATENT DOCUMENTS

| | | | |
|---|---|---|---|
| 2014/0101533 A1* | 4/2014 | Imrich | G06F 17/3089 |
| | | | 715/234 |
| 2014/0281875 A1* | 9/2014 | Branton | G06F 17/241 |
| | | | 715/230 |
| 2014/0289232 A1* | 9/2014 | Lu | G06F 17/30867 |
| | | | 707/723 |
| 2016/0134602 A1* | 5/2016 | Poornachandran | H04L 63/0428 |
| | | | 713/171 |
| 2017/0046323 A1* | 2/2017 | Teskey | G06F 17/241 |

* cited by examiner

| USER ID | APPLICATION NAME | PAGE ID | ANNOTATION ID | ANNOTATIONS | IS SECURED |
|---|---|---|---|---|---|
| USER ID 1 | APPLICATION 1 | PAGE ID 1 | ANNOTATION ID 1 | <TEXT> | YES |
| USER ID 1 | APPLICATION 1 | PAGE ID 2 | ANNOTATION ID 2 | <TEXT> | YES |
| USER ID 1 | APPLICATION 2 | PAGE ID 1 | ANNOTATION ID 3 | <TEXT> | NO |
| USER ID 2 | APPLICATION 1 | PAGE ID 1 | ANNOTATION ID 4 | <TEXT> | NO |

FIG. 2A

| ANNOTATION ID | SHARED ID | ACCESS RIGHTS |
|---|---|---|
| ANNOTATION ID 1 | USER ID 2 | READ |
| ANNOTATION ID 1 | USER ID 3 | READ, WRITE |
| ANNOTATION ID 2 | NA | NA |

FIG. 2B

METHODS AND SYSTEMS FOR MANAGING ANNOTATIONS WITHIN APPLICATIONS AND WEBSITES

TECHNICAL FIELD

The disclosed subject matter generally relates to various applications and websites, and more particularly to methods and systems for managing annotations within the applications and websites.

BACKGROUND

With the advent of online storage and collaboration techniques, users are now able to conveniently share their personal or professional data (such as text files, multi-media files, or any form of electronic document) with family, friends, peers, or colleagues. An extension of this concept is now offered by web tools that allow sharing of web notes amongst users. There are multiple web tools that allow users to, a) manually create a web note in form of standalone memos, task reminders or to-do lists, b) store the web note on third party server/cloud or local to their mobile devices and desktops, and c) share it with other users.

A vital implementation of web notes is now found in the website environment. Typically, when a user encounters a useful piece of information on a webpage of a website, he can add a note (also known as annotations or write-ups) and share it with other users. This feature is facilitated by browser-based solutions or related art techniques, in particular a plug-in allows a user to create an annotation, save it, and/or share it. The save option of this plug-in stores the created annotation in one of the following ways: a) as cookies, b) on the hard disk of the user's machine, or c) on a third party server/cloud. Further, using the share option, the user can send the annotation to other users via social media or cloud integrated platforms. However, there are a few shortcomings of such a solution. First, when the annotations are saved as cookies or on the user's machine, this data is prone to accidental deletion. Further, secure environments tend to have cookies disabled. If the machine gets corrupted, the stored annotations can be lost. Also, since the plug-in is tied to a browser, which in turn is machine specific, this technique limits user's access across devices. For example, if an annotation was created and saved on a personal computer, it cannot be accessed by the user on any other device (or other personal computer). The user will need to re-install the plug-in on other devices to create annotations, which are again locally stored on those devices. This technique is also limited to web browsers and cannot be mobile applications or desktop applications. Second, when the annotations are saved on third party server/cloud and are shared via publically available channels (such as social media handles or cloud hosting sites), chances of data getting exposed to potential misuse increases—thereby raising data security risk. Third, this technique does not take into account the annotations at a user interface level. In other words, there is no cohesive association between multiple annotations added to a single web page, or annotations added to multiple web pages of a single website. In browser-based techniques, each annotation is treated as a standalone entry in a browsing session. Therefore, the users cannot track the annotations at each web page, or even annotations across the website. There is also no provision for tracking what annotations were shared with which users. Hence, there is no application or user context associated with these browser based annotation techniques. Further, since the annotations are saved on a machine, a user needs to perform a manual search on the disk files to identify the required annotations. This is a cumbersome and a time consuming exercise. Finally, this scheme is limited to generic websites, and is not reliably applicable for business related websites or applications. In business scenarios, browser plug-ins are usually blocked and/or cookies may be disabled. Also, sharing of data outside of the business network is not recommended. Thus, in light of the aforementioned shortcomings, it may be beneficial to provide methods and systems for securely and reliably managing annotations (for applications or websites, especially in a business setting).

SUMMARY

The present disclosure discloses a method for enabling a user to manage one or more annotations related to a host application, through an annotation tool. The host application includes one or more pages. Further, the annotation tool implements a user interface for managing the one or more annotations by the user. In accordance with the method, the user creates one or more annotations corresponding to a page, such that the one or more annotations are specific to the user and are automatically stored within the host application for further retrieval. The one or more annotations corresponding to the page are accessed each time the page of the host application is accessed by the user, and this access is made using any user device capable of accessing the host application. Further, the one or more annotations corresponding to the page are displayed to the user, each time the page of the host application is accessed by the user.

Further, the disclosure discloses a method for managing one or more annotations for a host application by an annotation tool, such that the annotation tool is pre-integrated with the host application. The host application includes one or more pages, and each page has a page identifier. First, the annotation tool receives the one or more annotations created by a user corresponding to a page of the host application. Typically, the user has a user identifier. The annotation tool identifies a page identifier of the page where the one or more annotations are created by the user. Next, the annotation tool associates the one or more annotations with the page identifier and the user identifier. The one or more annotations, along with the page identifier and the user identifier, are then stored by the annotation tool for further retrieval.

Additionally, the present disclosure discloses an annotation tool for managing one or more annotations related to a host application at a back-end. The host application has one or more pages and each page has a page identifier. The annotation tool is integrated with the host application and is configured for receiving one or more annotations created by a user corresponding to a page of the host application. Typically, the user has a user identifier. The annotation tool then identifies a page identifier of the page where the one or more annotations are created by the user. Next, the annotation tool associates the one or more annotations with the page identifier and the user identifier. The one or more annotations, along with the page identifier and the user identifier, are then stored by the annotation tool for further retrieval.

Moreover, the disclosure discloses a system that includes a host application and a server. The host application has a pre-integrated annotation tool. The annotation tool implements a user interface for enabling a user to manage one or more annotations related to a host application. The annotation tool is configured for creating one or more annotations corresponding to a page by the user, such that the one or more annotations are specific to the user. The one or more annotations are automatically stored within the host application for further retrieval. The created one or more annotations corresponding to the page are accessed each time the page of the host application is accessed by the user, such that the one or more annotations are accessible using any user device capable of accessing the host application. The annotation tool displays the one or more annotations corresponding to the page to the user, each time the page of the host application is accessed by the user. Further, the annotation tool implements a back-end interface for processing the one or more annotations related to the host application. First, the annotation tool receives the one or more annotations created by the user corresponding to a page of the host application. Typically, the user has a user identifier. The annotation tool identifies a page identifier of the page where the one or more annotations are created by the user. Next, the annotation tool associates the one or more annotations with the page identifier and the user identifier. The one or more annotations, along with the page identifier and the user identifier, are then stored by the annotation tool for further retrieval. The server of the system is coupled to the host application over a network. The server is configured for communicating with the back-end interface of the annotation tool for processing the one or more annotations corresponding to the page. Further, the server stores the host application along with the one or more annotations, the page identifier and the user identifier.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 2A and 2B illustrate exemplary annotation related entries stored in a database, according to an embodiment of the present disclosure.

DESCRIPTION

Figure 1:
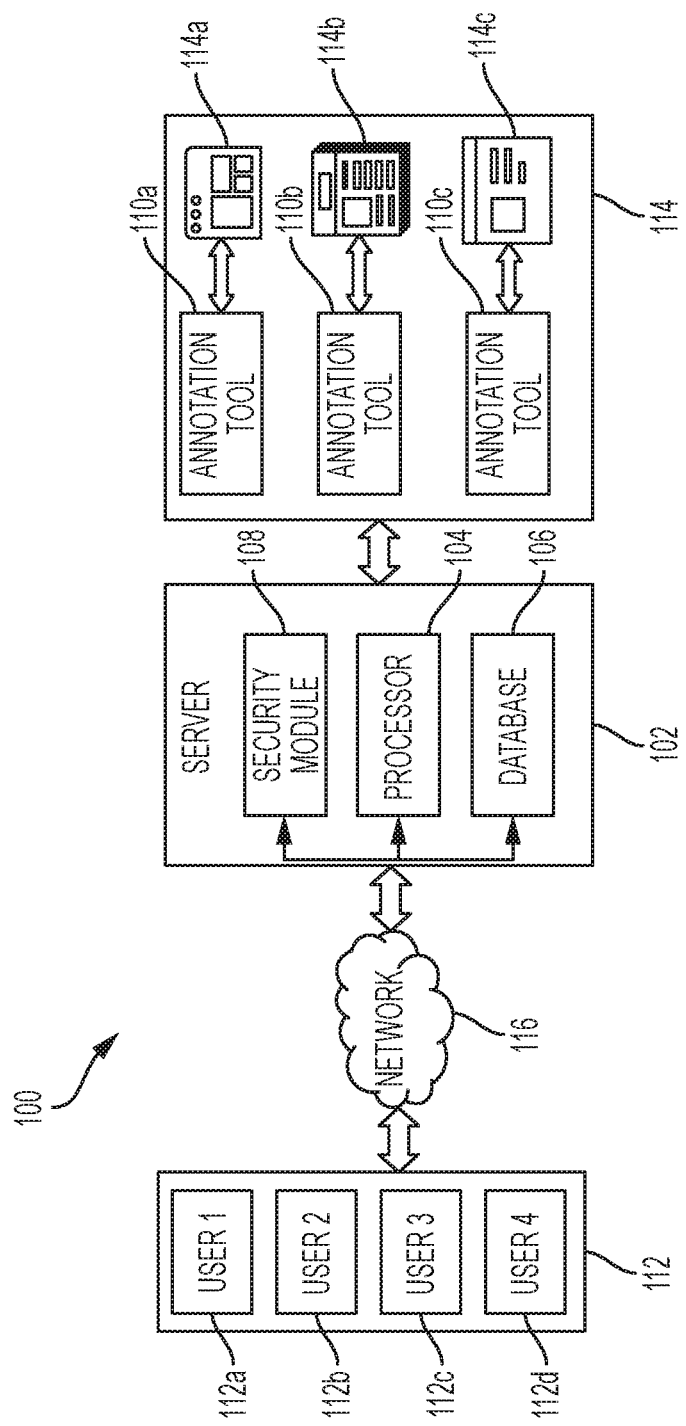
FIG. 1 is a schematic of an exemplary overall system, in which various embodiments of the disclosure may be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

A "user device" refers to a device that includes a processor/micro-controller and/or any other electronic component, or a device or a system that performs one or more operations according to one or more programming instructions. Examples of the user device include, but are not limited to, a desktop computer, a laptop, a personal digital assistant (PDA), a mobile phone, a smart-phone, a tablet computer, and the like.

The term "host application" collectively refers to any desktop or mobile application and/or a website. It can be a business workflow application, or any other application/website in a non-business setting.

In the context of the present disclosure, a "business workflow application" relates to an application used for performing business functions. Examples include, but are not limited to, company specific websites/portals/mobile applications/dashboards, reporting applications, Enterprise Resource Planning (ERP) based applications, business performance management portals, procurement applications, network management applications, document management applications, shipping application, auditing application, insurance domain related portals, and the like. The business workflow application can be implemented across multiple platforms, example a desktop version, a mobile version, a tablet version, and the like. Also, the application can be accessed using multiple user devices, wherein the application content across all user devices is uniform.

Each host application includes at least one page, wherein the term "page" refers to a document of a website or a desktop/mobile application, and includes text, images, videos, or any other multi-media information. The document can be accessed either via an online connection, or it can also be available offline. In case of an online connection, it can be accessed over a network via a browser engine or a mobile interface. In some examples, the page can be static in nature, while in other examples, the page can be dynamic.

A "user" may be any individual or an entity who has access rights for the host applications, and may also be referred to as a registered or an authorized user. For example, if the host application is a business workflow application, a user can be an employee of the business set-up. In other examples, the host application can be an application that enables services for customers and partners. The user can be an employee of the business, an employee of the partner to the business, an end-user or a customer.

As used herein, an "annotation" refers to any information input by a user in form of a comment, a remark, a write-up, a reference, an explanation, or any other thoughts/ideas. This information is then pinned to a specific page, or a specific portion of a page as a note.

An "annotation tool" refers to a tool for managing annotations for host applications. The tool has a front-end interface (i.e., a user interface) and a back-end interface. The front-end presents a user interface that includes various options using which the user can perform actions such as—create/add, store, delete, modify, or share the annotations. The back-end interface of the tool executes the instructions corresponding to each action performed by the user through the user interface. More details will be discussed in conjunction with FIGS. 1-5.

Overview

The present disclosure provides an efficient way for managing annotations for a host application, in particular, the annotations are maintained on the application's interface and allows easy access from anywhere anytime in a secured way. Here, the present disclosure discloses methods and systems for managing annotations within applications and websites (hereinafter together known as host applications). Further, the host applications can be available in multiple formats, such as a desktop application, standalone applications, a mobile application, a website or any other formats. The annotations are managed by an annotation tool (will be discussed below), wherein the tool is defined in the form of a front-end interface (i.e., a user interface) and a back-end interface. According to various embodiments, the front-end interface allows users of the host applications to perform a plurality of actions, such as but not limited to, create, delete, store, modify annotations, as well as share annotations with other users while using the host applications. According to various embodiments, the back-end interface executes necessary steps/instructions corresponding to any action performed by the user. For example, the back-end interface of the annotation tool can perform the steps of associating, retrieving, storing or processing annotations in a suitable format. In all, the annotation tool manages the annotations at a page level (User Interface UI) of the host application and the annotations are user specific. The annotation tool further allows the user to access the annotations from anywhere, anytime using user devices.

Exemplary Environment

FIG. 1 is a schematic of an exemplary overall system 100, in which various embodiments of the disclosure may be practiced. The system 100 includes a server 102, host applications 114, an annotation tool 110 (first to third annotation tools 110a-110c, and collectively referred to as the annotation tool 110), and users 112. In this exemplary environment, the users 112 (first to fourth users 112a-112d) are registered with the server 102 for using the host applications 114. In some embodiments, the users 112 may access the host applications without registration (or sign-up). Further, the users 112 access the host applications using one or more user devices and are connected to the server 102 via a network 116. Various examples of the user devices include, but are not limited to, desktop computers, laptops, mobile phones, smart phones, Personal Digital Assistant (PDA), tablets, and the like. Further, the network 116 can be a wired link or a wireless link, such as but not limited to, a Local Area Network (LAN), a Wide Area Network (WAN), a Wi-Fi network, a carrier based data packet network, and the like.

The host applications 114 include a plurality of individual applications, 114a, 114b, and 114c, and can be in the form of one or more of desktop applications, mobile applications, and websites. Typically, each of the host applications 114 includes one or more pages that include the content. The one or more pages may be linked to each other. In an exemplary embodiment of the disclosure, the host applications 114 correspond to business workflow application. Examples of business workflow application include, but are not limited to, company specific websites/portals/mobile applications/ dashboards, reporting application, Enterprise Resource Planning (ERP) based application, business performance management portals, procurement software, network management software, document management application, shipping application, auditing application, insurance domain related portals, and the like. In another embodiment of the disclosure, the host applications 114 may be any non-business applications, such as the ones accessible by the public outside of a corporate domain. For example, social networking and media applications that require secure login by users or groups of users. Further, the host applications 114 can be executed on multiple platforms. For example, the host application 114a can be a network management website accessible via a web browser, the host application 114b can be a native or downloaded mobile-based application that can be accessed via a smart phone, and the host application 114c can be a native desktop application. Further, the same version of an application, example the host application 114a, can also be available in multiple formats such that it can be accessed via a web browser, via a mobile-based application, or as a native desktop based application. In this scenario, the data/content available on the host application 114a is suitably synchronized w the server 102 such that a single uniform view of the data is maintained across all formats/platforms.

The server 102 includes a number of modules such as a processor 104, a database 106, and a security module 108; each of the modules is interconnected via a bi-directional data bus. The processor 104 includes one or more instructions to support overall data computation and management. The database 106 stores multiple types of data, such as the content related to the host applications 114, user information corresponding to the users 112, and the like. The database 106 will be discussed in greater detail with respect to FIG. 2. In some embodiments, the database 106 can be hosted outside of the server 102, such that an external communication link (not shown) is established to allow information exchange between the database 106 and the server 102. The server 102/database 106 maintain the annotations such that the annotations are user specific and application specific. For example, if the user 112a uses the host application 114a, for example, ERP and adds any annotations, the annotations are stored as specific to the user 112a and to the host application 114a. In another example, if the user 112b uses the host application 114b, for example, performance management, and adds any annotations and these annotations are specific to the user 112b and to the host application 114b. In other embodiments, the database 106 can also be a component of the user devices, and not the server 102 (not shown). This scenario is applicable when a host application 114 corresponds to a standalone application that is only available locally on a user device. For example, in a corporate environment, a host application can be pre-installed on a desktop computer by an administrator. In other words, the host application is accessible only from a pre-determined desktop. Any data associated with the host application will be stored locally on the desktop computer itself, such that the local storage corresponds to the database 106. The security module 108 is configured to evaluate the security information for each of the users 112, and to assess if the users 112 are authorized to access the server 102. The security information can be stored in the database 106. An example of the security information includes the login credentials associated with the users 112. The login credentials include, but are not limited to, user identifiers (IDs) and passwords, security questions, and the like. In another example, the security information includes the authorization details that determine whether a user is allowed to access any of the host applications 114. Another example is the access right details that govern what privileges (read, write, delete, or modify) are available to a user with respect to content of the host applications 114. This information can be stored in form of Access Control Lists (ACLs). In some embodiments, the security module may be used to encrypt the annotations using algorithms known in the art to ensure authorized access to the annotations.

In a specific context of the disclosure, the system 100 includes an annotation tool 110 to manage annotations on the host applications 114. Annotations are any notes, remarks, comment, thoughts/ideas, and the like, that can added to any portion of the host applications 114 by the users 112.

The annotation tool 110 is integrated with the host applications 114. For example, the annotation tool 110a is integrated with the host application 114a. In some embodiments, the annotation tool 110 is pre-integrated with the host application. For simplicity, the annotation tool 110 can be seen in the form of a front-end module and a back end module. The front-end module provides a user interface to the users 112 to perform one or more functions, such as create/add, display, modify, delete, or share annotations. The one or more functions can be executed by any appropriate input devices available on the user devices employed by the users 112 (not shown). Examples of the input devices include, keyboard, mouse, stylus, touch screen based schemes, joystick, voice control, and the like. The back-end module of the annotation tool 110 executes the necessary instructions corresponding to each action/function performed on the front-end. For example, if a user selects a function to save an annotation, the back-end module will invoke the instruction to store the annotation (along with necessary identifiers, to be discussed in detail with FIGS. 2A and 2B) in the database 106. The server 102 is configured to communicate with the annotation tool 110 for processing all functions related to the annotations.

The annotation tool 110 may be a platform independent component, which can be published on the server 102 and can be downloaded from the server 102. The tool can then be integrated into any host application. Specifically, the annotation tool 110 is built using one or more GUI based technologies. Further, the front-end of the annotation tool 110 can be represented in multiple formats. One example is a form of control (for example a text box, a date control, etc.) that can be permanently seen on a web page or on a windows based screen. In another example, the front-end may be displayed as a minimized selectable option, which when triggered by the user displays the complete user interface.

The users 112 first register for the annotation tool 110, before proceeding to use any of the one or more functions. The registration is governed by separate login credentials, though in one of the embodiments, the annotation tool 110 uses the security information already stored in the security module 108 to authorize the users 112. The security information is used to authorize the users 112 when they connect to the server 102 and request to access any of the host applications 114. Therefore, the security information can be used to perform a single-sign on for the annotation tool 110 such that when the users 112 are authorized by the security module 108 to access the host applications 114, the users 112 are also automatically registered to use the annotation tool 110.

In an embodiment, the annotations created by the annotation tool 110 are stored within the host applications 114. In other words, the storage can be in the database 106 or otherwise at the server 102. This allows the users 112 to access the annotations from any location at any given time, as long as the users 112 are authorized to use the annotation tool 110. For example, the user 112a employs a smart phone to access the host application 114a and adds an annotation. If the user 112a now employs a separate device, such as a desktop computer, and re-accesses the host application 114a, the same annotation is reflected. Moreover, a consistent view of the annotation tool 110 is provided on each page of the host applications 114, across all user devices. In this manner, the system 100 focuses on managing annotations related to the host applications 114 as shown in FIG. 1. In another embodiment, the annotations are stored locally on any user device. This scenario is applicable when a host application corresponds to a standalone application that is only available locally on a user device. For example, in a corporate environment, a host application can be pre-installed on a desktop computer by an administrator. In other words, the host application is only accessible from a pre-determined desktop. All annotation created on the desktop computer (via the annotation 110) will be stored locally on the desktop computer itself.

Exemplary Database Entries

FIGS. 2A and 2B illustrate exemplary annotation related entries stored in the database 106. In accordance with FIG. 2A, a table 200 is stored in the database 106 that includes details of the annotations saved corresponding to the host applications 114. It will be apparent to a person skilled in the art that the table 200 is only one exemplary representation, and the details can be stored in other schemas. Also, the details shown in FIG. 2A can be stored across multiple tables and the details can be colligated via a primary key (a common data column).

The table 200 includes a plurality of data columns. A column 202 stores user identifiers uniquely associated with each user of the system 100. In an embodiment, the users 112 are first registered to the server 102 and are then allowed to access any of the host applications 114. The server assigns a unique user identifier to each user, which is stored in the database 106. In another embodiment, the unique user identifiers correspond to separate identifiers which are uniquely associated with the annotation tool 110. In such a scenario, after the users 112 are authenticated by the server 102, the users 112 perform a separate registration for the annotation tool 110 and are assigned user identifiers. The syntax of a user identifier can include, but is not limited to, an alphabetic string, an alphanumeric string, email addresses, any combination of text, numbers, special characters, and the like. A column 204 stores the name of the one or more host applications 114 for which each user has access to. Alternatively, the host applications 114 may be assigned a unique identifier each, and these identifiers can also be stored in the table 200 along with or instead of the application names.

According to the disclosure, the host applications 114 include one or more pages, and each page is assigned a page identifier. When a user creates one or more annotations on any page of the host applications 114, the page identifier of the annotated pages are saved in a column 206. Therefore, if a user has created annotations on multiple pages of a host application, the other page identifiers for all such pages are stored in the table 200. Next, a column 208 stores an identifier assigned to each annotation. A column 210 stores the content of each annotation. Finally, a column 212 includes a Boolean value that indicates whether an annotation is encrypted. For the entries marked as "Yes" in the column 212, the corresponding annotation entries in the column 210 are encrypted for additional security. Further, the table 200 can include more columns that provide supplementary information about each annotation. An example includes a column indicating a timestamp of annotation creation or modification. This can be used to keep an audit trail for all annotations.

In accordance with FIG. 2B, a table 214 is stored in the database 106 that includes collaboration details of all saved annotations. It will be apparent to a person skilled in the art that the table 214 is only one exemplary representation, and the details can be stored in other schemas. Further, in an embodiment of the disclosure, instead of maintaining a separate table, the details available in the table 214 can be merged with the table 200.

The table 214 includes a plurality of columns. The first is the column 208, which stores the annotation identifiers. The column 208 is the same as available in the table 200, and acts as foreign key to help associate the data available in the table 200 and the table 214. According to an exemplary embodiment of the disclosure, the users are allowed to share their annotations with other users. By sharing an annotation, a user allows the other users to read, write, delete, or modify it; subject to the access level assigned by the user who wishes to share the annotation. In an embodiment, a user can share annotations only with the other users who are registered with the annotation tool 110. Therefore, when the user selects the other users with whom the annotation will be shared, the user identifiers of the other users are saved in a column 216. Next, the access level assigned to each of the other users is stored in a column 218. As an example, in FIG. 2A, a user with ID 1 creates an annotation which is assigned an annotation ID 1. These details are stored in the column 202, the column 210, and the column 208, respectively. Now referring to FIG. 2B, the user with ID 1 opts to share the annotation with two users, one having a user ID 2 and the other with a user ID 3 (details stored in the column 216). The user with ID 2 is only assigned a read access to the annotation, while the user with ID 3 is assigned a read and a write access. The details of the access rights are stored in the column 218.

Exemplary Method Flowchart

Figure 3:
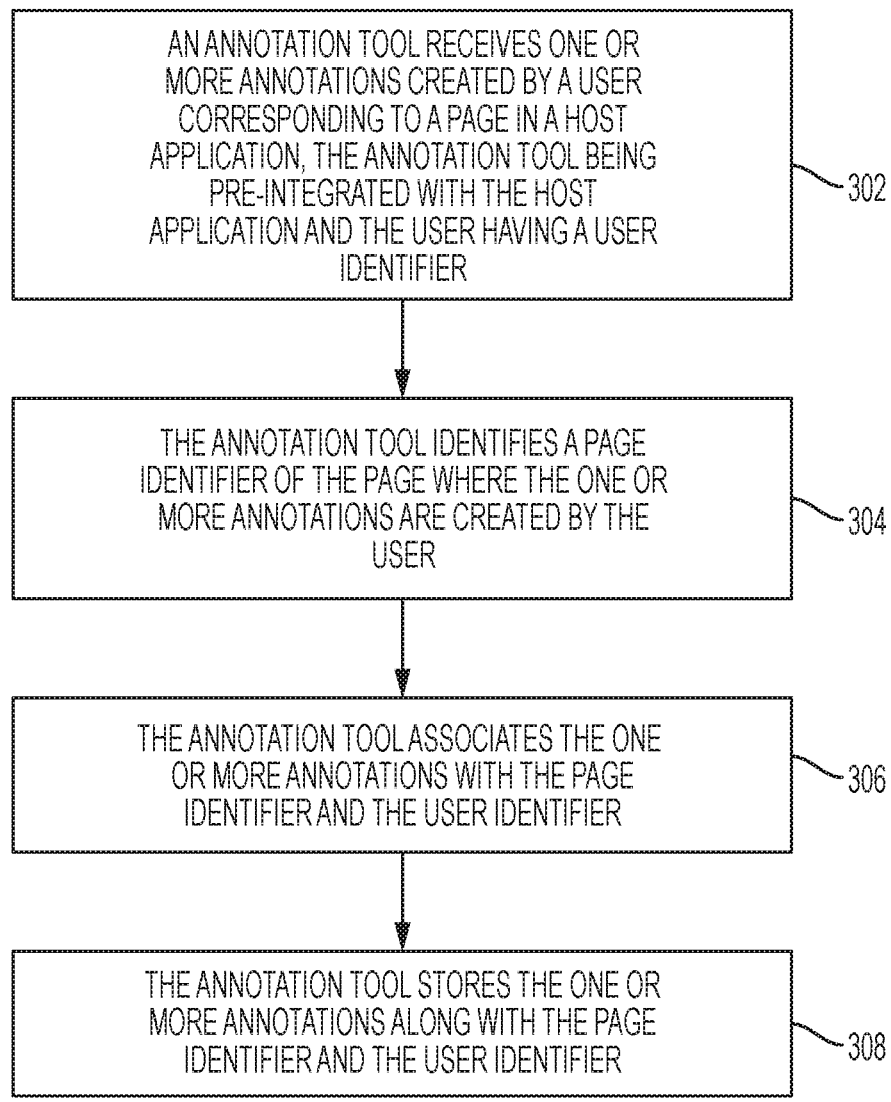
FIG. 3 is a method for managing annotations using an annotation tool within applications.

The method provides a secure and easy way to annotate, store and share data securely at page level of a host application. FIG. 3 is a method for managing annotations using the annotation tool 110 within the host applications 114. According to the disclosure, the annotation tool 110 is pre-integrated with the host applications 114, therefore the users are not required to install any third party applications. The annotation tool 110 presents a user interface to a user to perform one or more functions, such as create, display, modify, delete, or share annotations. This user interface is available across all devices accessed by the user and presents a consistent view of all annotations. The specifics of the user interface will be discussed later with reference to FIGS. 4A-4C.

In order to annotate any page of the host applications 114, a user has to activate the annotation tool 110 and then signup. This is a one-time activity. After signing-up, the user is assigned a unique user identifier. The format of the unique identifier includes, but is not limited to, an alphabetic string, an alphanumeric string, email addresses, any combination of text, numbers, special characters, and the like. In another embodiment, instead of separately signing-up for the annotation tool 110, the security details used by the users 112 to authenticate themselves with the server 102 can be used to automatically register them with the annotation tool 110. For example, while accessing any desktop application in a corporate environment, a user provides a login credential (security information, which includes a user identifier) on a desktop machine. These login credentials can also be used to automatically sign-in the user to the annotation tool 110. Therefore, the sign-in/sign-up can be both manual and automatic. The aforementioned sign-up or sign-in information is saved in the database 106. Once the user successfully registers himself to use the annotation tool 110 or the server 102, the user is referred to as registered/authorized user.

Once the user has registered with the annotation tool 110, at 302 the method starts with the user creating one or more annotations on a page of a host application, for example the host application 114a. In case the user had previously registered, he provides his login credentials on the annotation tool 110 to sign-in. Specifically, each user is assigned a user identifier to validate the registration. Further, while creating the one or more annotations, the user may also specify a page of the host application 114a and/or specific portions of the page on which the annotation will be created. Typically, each host application includes multiple pages, and each page has a page identifier. In some embodiments, each host application has a host identifier. For example, if the host application is a network management website, an exemplary page can be the one that discusses printer configuration. If the user wants to add his comments or thoughts on a particular printer configuration, he can create an annotation on this particular page itself. The annotation tool 110 receives the created one or more annotations. At 304, the annotation tool 110 identifies a page identifier associated with the page where the one or more annotations have been created by the user. This identification is made by accessing the required data from the database 106. In an embodiment of the disclosure, the content on each page of the host applications 114 can include multiple portions/sub-sections/categories, wherein each of these portions/sub-sections/categories can be identified from the source code of the application or website. The identifiers for each of these portions/sub-sections/categories can also be stored in the tables of the database 106 and then identified by the annotation tool 110 when an annotation needs to be created.

Next, at 306, the annotation tool 110 associates the created one or more annotations with the page identifier and the user identifier. At 308, the one or more annotations are then saved within the host application 114a, along with the page identifier and the user identifier (in the database 106), and can be later accessed by the user. Typically, each time the user accesses the page of the host application 114a using any user device, the annotation tool 110 accesses the previously created one or more annotations and displays these to the user in real-time.

In an embodiment, the registered user can also collaborate with other users on the one or more annotations and can decide what action items are permitted for the other users. The action items are access rights and include at least one of a read access, a write access, a delete access, or a modify access. If the registered user chooses to share the one or more annotations, he/she will use one or more functions presented on the annotation tool 110 to initiate the request to share. The request also includes the details of the one or more users with whom the one or more annotations are to be shared, and the associated access rights. The annotation tool 110 will receive the request from the registered user. As a subsequent step, the annotation tool 110 identifies the user identifiers of the one or more users from the database 106, and share the one or more annotations with the one or more users. In context of the present disclosure, the one or more users must also be pre-registered with the annotation tool 110 such that each of them has a unique user identifier. Using this technique, the disclosure ensures that the one or more annotations are shared securely with only the authorized users. In another embodiment of the disclosure, the one or more users may not be pre-registered with the annotation tool 110. When the registered user wants to share the one or more annotations, he can use an "invite" option on the user interface of the annotation tool 110. On receipt of the invite, the one or more users may then proceed to register on the annotation tool 110 and accordingly access the one or more annotations.

Exemplary Snapshots

Figure 4A:
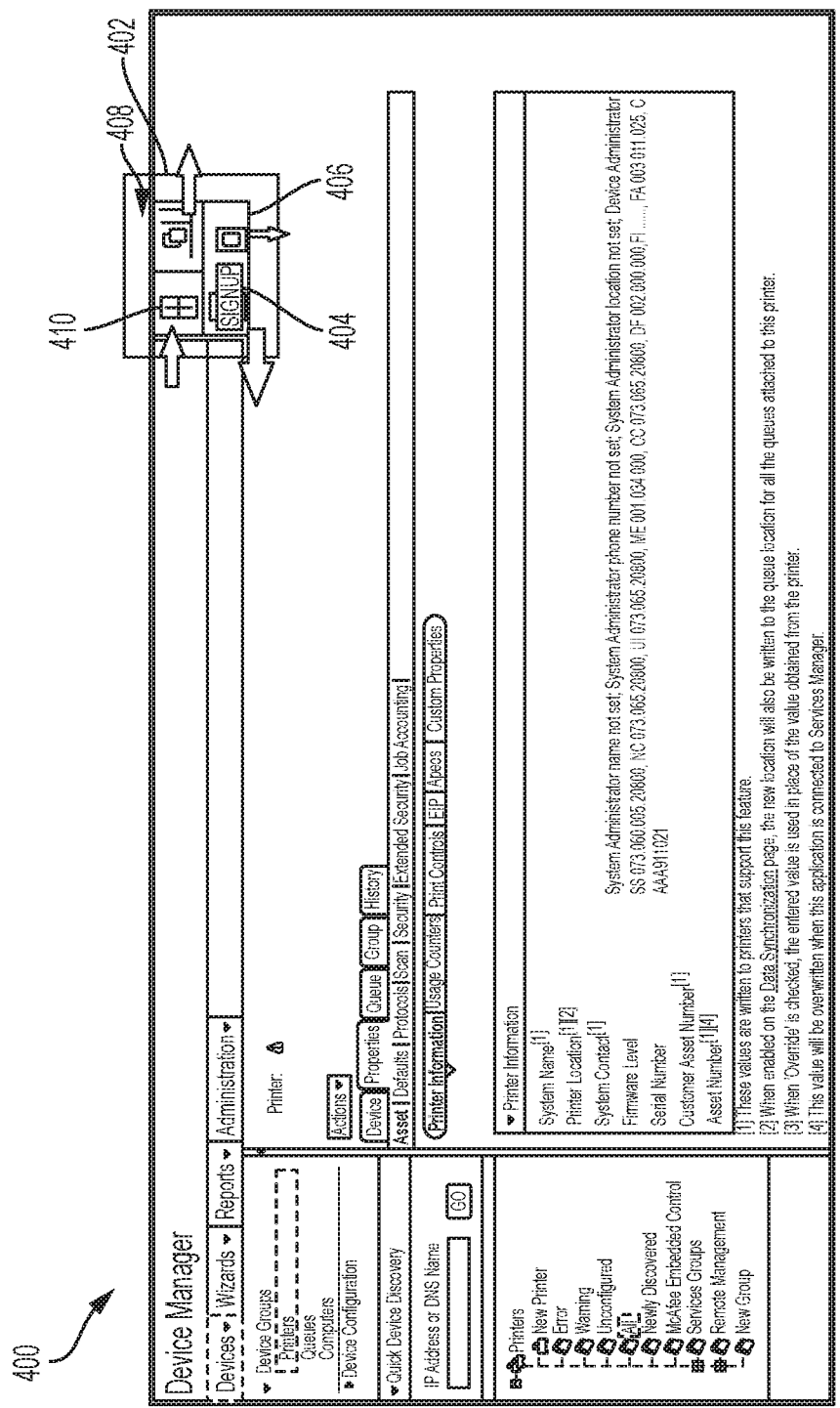
FIGS. 4A-4C are exemplary snapshots illustrating a sequence for managing annotations within the applications.
Figure 4B:
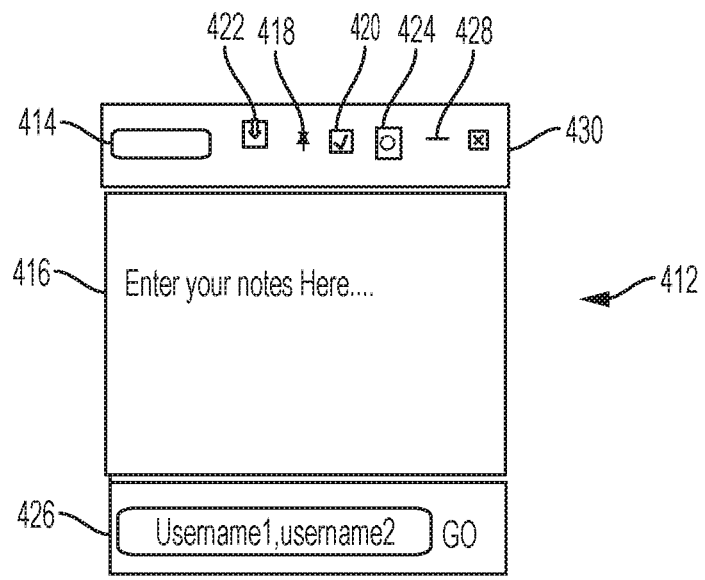
Figure 4C:
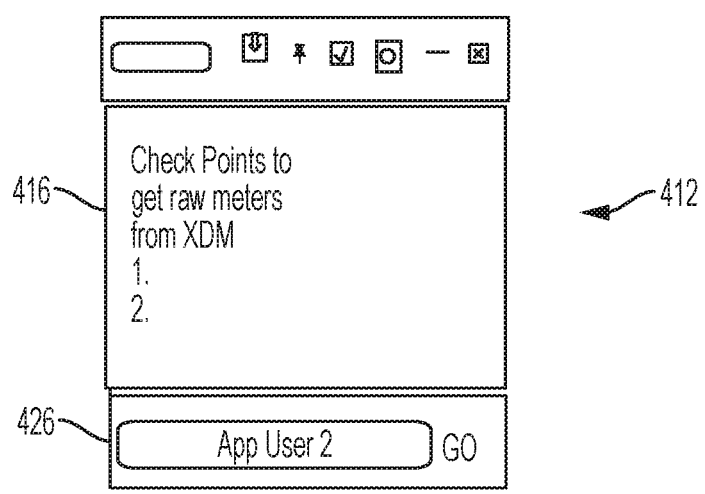

FIGS. 4A-4C are exemplary snapshots illustrating a sequence for managing annotations within the host applications 114.

Referring to FIG. 4A, a page 400 of a host application, example the host application 114a, is discussed. The page 400 displays a user interface of an annotation tool 402 which allows management of the annotations. Essentially, the annotation tool 402 includes a front-end module and a back-end module. The front-end module is the user interface using which the user can perform one or more actions, such as creating/adding, updating, deleting, modifying any annotations or any similar functions. The back-end module of the annotation tool 402 integrates with the database 106 and the security module 108 to execute the programming methods behind each action performed on the front-end, and also manages the annotations. The details of the back-end module will be discussed with reference to FIG. 5.

In FIG. 4A, the user interface (front-end) of the annotation tool 402 is displayed on every other pages of the host application 114a. In an exemplary embodiment, the annotation tool 402 includes multiple options: a sign up option 404, a view option 406, a view-all option 408, a create option 410. The sign-up option 404 allows a user to register/authorize himself on the annotation tool 402. As discussed with reference to FIG. 3, this is a one-time activity. Post signing-up, the registered/authorized user can continue to use the annotation tool 402 on any of the host applications 114. In another embodiment of the disclosure, the user may need to sign-up for the annotation tool 402 separately for each of the host applications 114. When the sign-up option 404 is selected, a dialog box (not shown in FIG. 4A) will prompt the user to provide necessary login credentials. The login credentials can include a user name/display name and password combination, only a display name, one or more security questions, and the like. Every user who wants to access the annotation tool 402 is assigned a display name. Post successful authorization, the sign-up option 404 may be replaced by a log-out option (now shown).

Further, in an exemplary embodiment of the disclosure, the user just needs to sign-in to the annotation tool 402 once, and the login credentials can remain valid for all subsequent active browsing sessions across any of the host applications 114. For example, while accessing the host application 114a the user has signed-in to the annotation tool 402, and if he then proceeds to access the host application 114b, the user need not sign-in to the annotation tool 402 again. In another embodiment of the disclosure, the user will sign-in to the annotation tool 402 separately at each of the host applications 114.

In yet another embodiment, the signing up could be automatic, wherein the annotation tool 402 can authenticate the user based on any other previous credentials associated with the host application 114a. For example, the user might have used a login credential to authenticate himself on the server 102, before he was allowed to access the host application 114a. These login credentials can be used to automatically register the user with the annotation tool 402.

Using the view option 406, all the annotations associated with the page 400 will be displayed to the user. The user can proceed to view, modify or delete these annotation entries. The view-all option 408 allows the user to view the annotations associated with all other pages of the host application 114a. Typically, any host application includes at least one page. Therefore, the user has the provision of adding annotations to any page of any host application. On selecting the view-all option 408, all previously stored annotations with any page of the host application 114a will be accessed and displayed to the user. Akin to the view option 406, the view-all option 408 can also allow the user to modify or delete these annotation entries. In an embodiment of the disclosure, the annotation tool 402 may also provide a search interface (not shown). The user can input a string or keywords in the search interface, and the matching annotations of the host application 114a will be displayed.

For adding new annotations, the user can select the create option 410. Now referring to FIG. 4B, a user interface 412 is displayed when the create option 410 is selected. The user interface 412 includes a field 414 which indicates the display name of the signed-in user. As discussed previously, the display name is unique to all users of the annotation tool 402 and corresponds to a unique user identifier. A field 416 allows the user to input an annotation. In an embodiment of the disclosure, the field 416 may provide a plurality of text formatting options (not shown) using which the user can appropriately format the annotation. Examples include, but are not limited to, font size, font type, font color, numbering schemes, text highlighting, text alignment, and the like.

Once the user has input the annotation, he can select an option 418, which pins the annotation to the current page 400 of the host application 114a. In an embodiment, the option 418 might allow a user to specify what other pages the same annotation should be pinned to. Next, an option 420 allows the user to save the annotation. In case the user deems the annotation as confidential, he can select an option 422 (instead of the option 420) and the annotation will be encrypted prior to being saved. In an embodiment, the function of pinning (via the option 418) can be automatically performed if the user saves the annotation (via the option 420). Further, an option 428 allows the user to hide or minimize the user interface 412.

The user can also share the annotation with other users. This is facilitated by an option 424, which when selected invokes a field 426. The user can input the display names of the others users with which the annotation will be shared. The display names are unique to all users and represent the user identifiers. Examples of the display names include, but are not limited to, an alphabetic string, an alphanumeric string, email addresses, any combination of text, numbers, special characters, and the like. The field 426 may also present an option to search the database 106 (not shown) and select required display names. In another embodiment, the field 426 may show the display names of the users with whom annotations are frequently shared. The user may also have the facility of adding a few users as favorites, and accordingly their display names can be prompted as suggestions. In another embodiment, the user interface 412 includes an "invite" option (not shown) using which the user can invite the other users who are not registered with the annotation tool 402. On receipt of the invite, the other users can complete the registration on the annotation tool 402 and proceed to access the shared annotations. In yet another embodiment, the user can indicate one more access rights (read, write, modify, delete) for each of the other users.

FIG. 4C illustrates an exemplary filled screenshot of the user interface 412. The user has input an annotation in the field 416, and in the field 426 he has provided the display name "App User 2" which whom the annotation will be shared.

As discussed with reference to FIG. 4A, the view option 406 of the annotation tool 402 displays all annotations associated with the page 400, and the view-all option 408 displays all annotations associated with all pages of the host application 114a. An exemplary representation for both these can include displaying a list of annotations to the user (not shown), wherein when any of the annotation is selected the corresponding user interface 412 is displayed. The user can then proceed to perform one or more the following functions: edit the selected annotation using the field 416, pin it to a page using the option 418, save it using the option 420, securely save it using the option 422, share it with other users using the option 424 and the field 426, or delete it using an option 430.

In an embodiment of the disclosure, when the user modifies an existing annotation which was already shared with other users, an audit trail of the annotation can be maintained. For example, an annotation read "Protocol settings of the printer are 123", and it was later modified to "Protocol settings of the printer are 456." The other users with whom this annotation was shared can view the entire editing chain. In another embodiment, instead of displaying both original and edited annotation to the other users, the annotation tool 402 may only display the edited annotation and suitably indicate that the annotation has been edited. Examples include, but are not limited to, highlighting the edited text in a different font color, font type, or font size, adding an asterisk or any other special character, displaying the last edit timestamp, and the like.

Exemplary Information Flow

Figure 5:
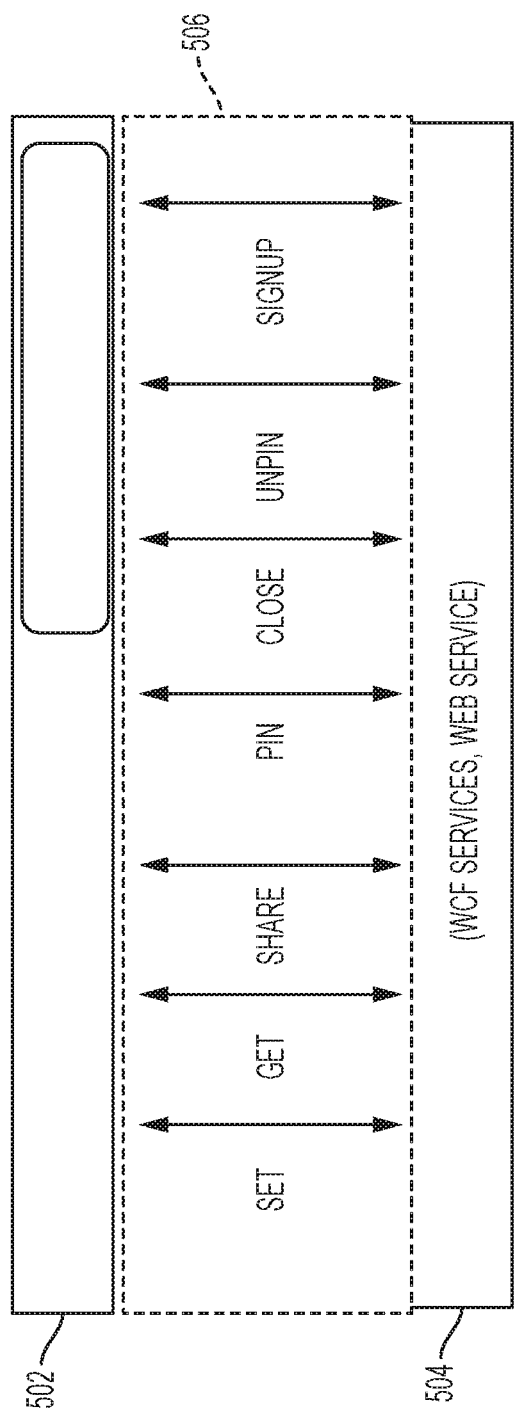
FIG. 5 illustrates an exemplary interaction between a server and applications, according to an embodiment of the present disclosure.

FIG. 5 illustrates an exemplary interaction between the server 102 and the host applications 114. A layer 502 denotes the host applications 114 of the disclosure, which can be designed using any of the coding technologies or platforms available in the art. A layer 504 include the Service Oriented Architecture (SOA) based services which are executed at the server 102 to provide dedicated support to the host applications 114. A layer 506 encompasses an information flow between the layer 502 (of the host applications 114) and the layer 504 (of the server 102). This information flow is executed by a back-end module of the annotation tool 402 using a plurality of methods that are coded using any of the existing programming languages. A few examples of the plurality of methods will be explained in conjunction to FIGS. 4A and 4B.

When the user accesses one of the host applications 114, the user interface (front-end) of the annotation tool 402 is displayed at each page, such as the page 400. When the user selects the sign-up option 404 from the user interface, the back-end module of the annotation tool 402 invokes a SIGNUP method to display an interface where the user can enter his login credentials. Next, when the user selects the view option 406 or the view-all option 408, a GET method is invoked by the back-end module to fetch the annotations from the database 106 and display these to the user. With reference to FIG. 4B, when the user enters an annotation in the field 416 and selects the option 418, the back-end module creates an annotation identifier, identifies the page identifier, and invokes a PIN method to associate the annotation identifier with the page identifier. This association is also disclosed in FIG. 2A. When the option 420 is selected, a SET method is invoked to save the annotation (along with the annotation identifier and page identifier) to the database 106. Next, a SHARE method is invoked when the user selects the option 424. If the user selects the option 430, an UNPIN method is used to remove the annotation identifier (and associated entries) from the database 106. Therefore, for each option or field available at the user interface of the annotation tool 402, the back-end module executes one or more methods to perform the necessary functionality. The aforementioned methods were exemplary cases only, and several other methods can be executed.

The disclosure may be implemented in many day-to-day scenarios without limiting to, for example, technical support areas, software testing, or many others. In technical support areas, support engineers may have notes regarding how to configure features in the supporting applications. The support engineers may also have notes to answers for general questions about the applications. In software testing, a tester may have some notes to expedite the testing of the web site. In all such scenarios, the annotation tool may enable the user to add annotations and/or perform any related functions.

The present disclosure provides an easy and efficient way for managing annotations for a host application and has a number of advantages. In particular, the annotations are maintained with the host application itself, in order to improve productivity of users. In other words, the annotations are saved within the application context instead of a third party server. In this way, each time the users want to view the annotations, they do not need to conduct a separate search in other files or emails. Further, the annotations are not dependent on cookies, browsers, or any third party plug-ins. The annotations further enhance users' productivity. The users are allowed to manage the annotations from anywhere the host application is available. (i.e., accessing the host application from any machines).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for enabling a user to manage one or more annotations related to a host application through an annotation tool, the host application includes one or more pages, wherein each page having a page identifier, the annotation tool implements a user interface for managing the one or more annotations by the user, the method comprising:
    receiving from the user one or more annotations corresponding to a first page, wherein the one or more annotations are specific to the user;
    storing the one or more annotations within the host application for further retrieval;
    retrieving the stored one or more annotations corresponding to the first page each time the first page of the host application is accessed by the user, wherein the one or more annotations are accessible using a user device capable of accessing the host application;
    displaying the one or more annotations corresponding to the first page to the user, each time the first page of the host application is accessed by the user;
    receiving an input from the user specifying one or more other pages the one or more annotations corresponding to the first page are to be pinned to; and
    automatically pinning the one or more annotations to the specified one or more other pages when storing the one or more annotations within the host application.

2. The method of claim 1, further comprising sharing the one or more annotations with other users of the host application.

3. The method of claim 1, further comprising performing one or more pre-defined functions for the one or more annotations, wherein the one or more pre-defined functions include an add function, a delete function, a modify function, and a share function.

4. The method of claim 1, wherein the annotation tool is integrated with the host application.

5. A method for managing one or more annotations for a host application by an annotation tool, the annotation tool is pre-integrated with the host application, wherein the host application having one or more pages, each page having a page identifier, the method comprising:
    receiving, by the annotation tool, the one or more annotations created by a user, corresponding to a first page of the host application, the user having a user identifier;
    identifying, by the annotation tool, a page identifier of the first page where the one or more annotations are created by the user;
    associating, by the annotation tool, the one or more annotations with the page identifier and the user identifier;
    storing, by the annotation tool, the one or more annotations along with the page identifier and the user identifier, for further retrieval;

receiving an input from the user specifying one or more other pages the one or more annotations corresponding to the first page are to be pinned to; and automatically pinning the one or more annotations to the specified one or more other pages when storing the one or more annotations.

6. The method of claim 5, wherein the host application comprises at least one of a standalone desktop application, a mobile application, and a website.

7. The method of claim 5, further comprising retrieving, by the annotation tool, the one or more annotations when requested by the user, the one or more annotations are retrieved each time the first page of host application is accessed by the user using a user device.

8. The method of claim 7, further comprising displaying the one or more annotations associated with the page identifier and the user identifier to the user.

9. The method of claim 5, further comprising encrypting, by the annotation tool, the one or more annotations before storing the one or more annotations.

10. The method of claim 5, further comprising storing, by the annotation tool, the one or more annotations within the host application.

11. The method of claim 5, further comprising sharing, by the annotation tool, the one or more stored annotations corresponding to the first page, with one or more other users.

12. The method of claim 11, wherein the one or more other users access the one or more shared annotations based on access rights defined by the user.

13. The method of claim 5, wherein the annotation tool provides a user interface to the user to create the one or more annotations corresponding to the first page in real-time.

14. The method of claim 5, wherein the annotation tool provides a user interface to the user to perform one or more pre-defined functions related to the one or more annotations in real-time.

15. The method of claim 5, wherein the host application is accessible over a network.

16. A non-transitory computer readable medium encoded with instructions that, when executed by a processor, provides an annotation tool on a computer for managing one or more annotations related to a host application at a back-end, the host application having one or more pages, each page having a page identifier, the annotation tool is integrated with the host application and is configured to perform operations comprising:

receiving one or more annotations created by a user corresponding to a first page of the host application, wherein the user having a user identifier;

identifying a page identifier of the first page where the one or more annotations are created by the user;

associating the one or more annotations with the page identifier and the user identifier;

storing the one or more annotations along with the page identifier and the user identifier for further retrieval;

receiving an input from the user specifying one or more other pages the one or more annotations corresponding to the first page are to be pinned to; and automatically pinning the one or more annotations to the specified one or more other pages when storing the one or more annotations.

17. The non-transitory computer readable medium of claim 16, wherein the operations further comprise retrieving the one or more created annotations corresponding to the page identifier when requested by the user.

18. The non-transitory computer readable medium of claim 16, wherein the operations further comprise displaying the one or more stored annotations to the user, each time the first page of the host application is accessed by the user.

19. The non-transitory computer readable medium of claim 16, wherein the operations further comprise encrypting the one or more annotations before storing the one or more annotations.

20. The non-transitory computer readable medium of claim 16, wherein the host application is connected to a server over a network.

21. A system comprising:

a host application having a pre-integrated annotation tool, wherein the annotation tool implements a user interface for enabling a user to manage one or more annotations related to the host application and is configured for:

creating one or more annotations corresponding to a first page based on inputs received from the user, wherein the one or more annotations are specific to the user;

automatically storing the one or more annotations within the host application for further retrieval;

accessing the stored one or more annotations corresponding to the first page, each time the first page of the host application is accessed by the user, wherein the one or more annotations are accessible using a user device capable of accessing the host application; and displaying the one or more annotations corresponding to the first page to the user, each time the first page of the host application is accessed by the user;

receiving an input from the user specifying one or more other pages the one or more annotations corresponding to the first page are to be pinned to, wherein the annotation tool implements a back-end interface for processing the one or more annotations related to the host application and is configured for:

identifying a page identifier of the page where the one or more annotations are created by the user, wherein the user has a user identifier;

associating the one or more annotations with the page identifier and the user identifier; and storing the one or more annotations along with the page identifier, for retrieval by the user, each time the first page of host application is accessed by the user using a user device; and when storing the one or more annotations, automatically pinning the one or more annotations to the specified one or more other pages based on the input from the user specifying one or more other pages the one or more annotations corresponding to the first page are to be pinned to; and a server coupled to the host application over a network, the server configured for:

communicating with the annotation tool for processing the one or more annotations corresponding to the page; and storing the host application along with the one or more annotations.

22. The system of claim 21, wherein the annotation tool is integrated with one or more other host applications.

23. The system of claim 21, wherein the annotation tool is maintained over the network.

24. The system of claim 21, wherein the host application comprises at least one of a standalone desktop application, a mobile application, and a website.

25. The system of claim 21, wherein the annotation tool is configured for sharing the one or more annotations with one or more other users.

26. The system of claim 21, wherein the annotation tool is configured for linking the one or more annotations with the first page of the host application.

* * * * *